United States Patent
Chang

(10) Patent No.: US 6,536,589 B2
(45) Date of Patent: Mar. 25, 2003

(54) PROTECTION DEVICE OF PERSONAL DIGITAL ASSISTANT

(76) Inventor: Tery Chih-Hao Chang, 3F, No. 117, Cheng Kung Rd., Sanchung City, Taipei Hsien (TW)

( * ) Notice: Subject to any disclaimer, the term of this patent is extended or adjusted under 35 U.S.C. 154(b) by 44 days.

(21) Appl. No.: 09/835,511

(22) Filed: Apr. 17, 2001

(65) Prior Publication Data

US 2002/0148745 A1 Oct. 17, 2002

(51) Int. Cl.[7] .............................................. B65D 85/00
(52) U.S. Cl. ..................................... 206/320; 206/305
(58) Field of Search ............................... 206/305, 320, 206/701, 722; 455/90, 128, 351

(56) References Cited

U.S. PATENT DOCUMENTS

| | | | | |
|---|---|---|---|---|
| 4,420,078 A | * | 12/1983 | Belt et al. ................... | 206/305 |
| 5,484,063 A | * | 1/1996 | Cuccio et al. ............... | 206/320 |
| 5,678,204 A | * | 10/1997 | Naylor ........................ | 206/305 |
| 5,904,898 A | * | 5/1999 | Markart ....................... | 206/305 |
| 6,347,796 B1 | * | 2/2002 | Grossman et al. .......... | 206/320 |

* cited by examiner

Primary Examiner—Luan K. Bui
(74) Attorney, Agent, or Firm—Rosenberg, Klein & Lee

(57) ABSTRACT

The present invention provides a protection device of a personal digital assistant (PDA). The protection device comprises a protection shell and a protection cover body. The protection shell has a receiving space therein to receive a PDA. The protection shell has a window at the front side thereof so that an electronic panel of a PDA can be exposed through the window. One end of the protection shell forms an opening so that a PDA can be conveniently placed into the receiving space. One end of the protection cover body is pivotally connected to the protection shell so that the protection cover body can cover on the window or be unfolded. A protection device of a PDA is thus formed. The present invention can effectively prevent the electronic panel of a PDA from abrasion and breakage and facilitate the use and keeping of a PDA.

4 Claims, 5 Drawing Sheets

PROTECTION DEVICE OF PERSONAL DIGITAL ASSISTANT

FIELD OF THE INVENTION

The present invention relates to a protection device of a personal digital assistant and, more particularly, to a protection device capable of preventing the electronic panel of a personal digital assistant from abrasion and breakage. Moreover, a protection cover of the protection device can be unfolded so that normal operations of the personal digital assistant will not be affected.

BACKGROUND OF THE INVENTION

A personal digital assistant (PDA) is a new kind of portable device. Its volume is much smaller than that of a notebook computer so that it can be placed on a palm and operated. Recently, the PDAs have been much valued, and more and more people start to use them.

A PDA has many functions. For instance, it can store thousands of pieces of personal information including address lists, schedules, agenda, memos, and so on. When one needs to find out somebody's telephone number, the PDA can quickly find out the required data for him, and it is not necessary for him to browse a notebook in a great bustle. When one needs to look up data of business cards, it is not necessary for him to search in a business card clip sweatily. All he needs to do is to click the PDA twice to exactly and quickly find out previously inputted data of business cards.

In addition to the above basic functions, most PDAs can link with a computer. For instance, electronic mails that have not been read at work can be transferred to a PDA to be read and replied on one's commuting ways. Some PDAs can install various kinds of application programs such as spreadsheets, electronic maps, text editors, electronic books, and even games and global positioning and guiding systems.

Additionally, some PDAs have built-in wireless communication modules. In addition to being used as beepers, they can also receive real-time information such as stock market news, traffic statuses, weather predictions, real-time news, and so on. In the future, it is hopefully that PDAs can be combined with mobile phones.

However, there is no protection device on the electronic panel (display screen) of a general PDA in the prior art so that the electronic panel may easily abrade and break. Especially, the electronic panel will easily abrade and break due to factors such as impact when taken along with a user.

A protection sleeve 20a can be disposed for some PDAs 10a. As shown in FIG. 1, the protection sleeve 20a is a hollow cuboid with an opening at the top thereof. The top of the protection sleeve 20a has a cover body 21a to cover the top opening of the protection sleeve 20a. Corresponding lock tools 22a and 23a are disposed on the protection sleeve 20a and the cover body 21a, respectively. The two lock tools 22a and 23a can be locked together to fix the cover body 21a.

The PDA 10a can be inserted into the protection sleeve 20a. The protection sleeve 20a is sleeved on the PDA 10a to prevent the electronic panel of the PDA from abrasion and breakage due to factors such as impact when the PDA is taken along with a user.

However, when the above protection sleeve 20a is sleeved on the PDA 10a, normal operations of the PDA 10a will be affected. It is necessary to pull the PDA 10a out from the protection sleeve 20a to use the PDA 10a. Therefore, a user needs to constantly and repeatedly pull the PDA 10a out from the protection sleeve 20a and then insert the PDA 10a into the protection sleeve 20a after used, resulting in much inconvenience in use.

Accordingly, the above protection sleeve of a PDA has inconvenience and drawbacks in practical use. The present invention aims to resolve the above problems in the prior art.

SUMMARY OF THE INVENTION

The primary object of the present invention is to provide a protection device of a PDA, whereby a PDA can be inserted into a protection shell. When the PDA is not used, a protection cover body can cover on an electronic panel of the PDA, so that the PDA can be exactly kept in the protection device to prevent the electronic panel from abrasion and breakage. Moreover, the protection cover body is pivotally connected to the protection shell. When the PDA is to be used, the protection cover body can be unfolded to expose the electronic panel of the PDA to facilitate the operation of the PDA. Normal operations of the PDA will not be affected so that the PDA needs not to be pulled out from the protection device, hence facilitating the use and keeping of the PDA.

To achieve the above object, the present invention provides a protection device of a PDA. The protection device comprises a protection shell and a protection cover body. The protection shell has a receiving space therein and a window at the front side thereof. One end of the protection shell forms an opening. One end of the protection cover body is pivotally connected to the protection shell so that the protection cover body can cover on the window or be unfolded. A protection device of a PDA is thus formed.

The various objects and advantages of the present invention will be more readily understood from the following detailed description when read in conjunction with the appended drawing, in which:

DETAILED DESCRIPTION OF THE PREFERRED EMBODIMENTS

Figure 1:
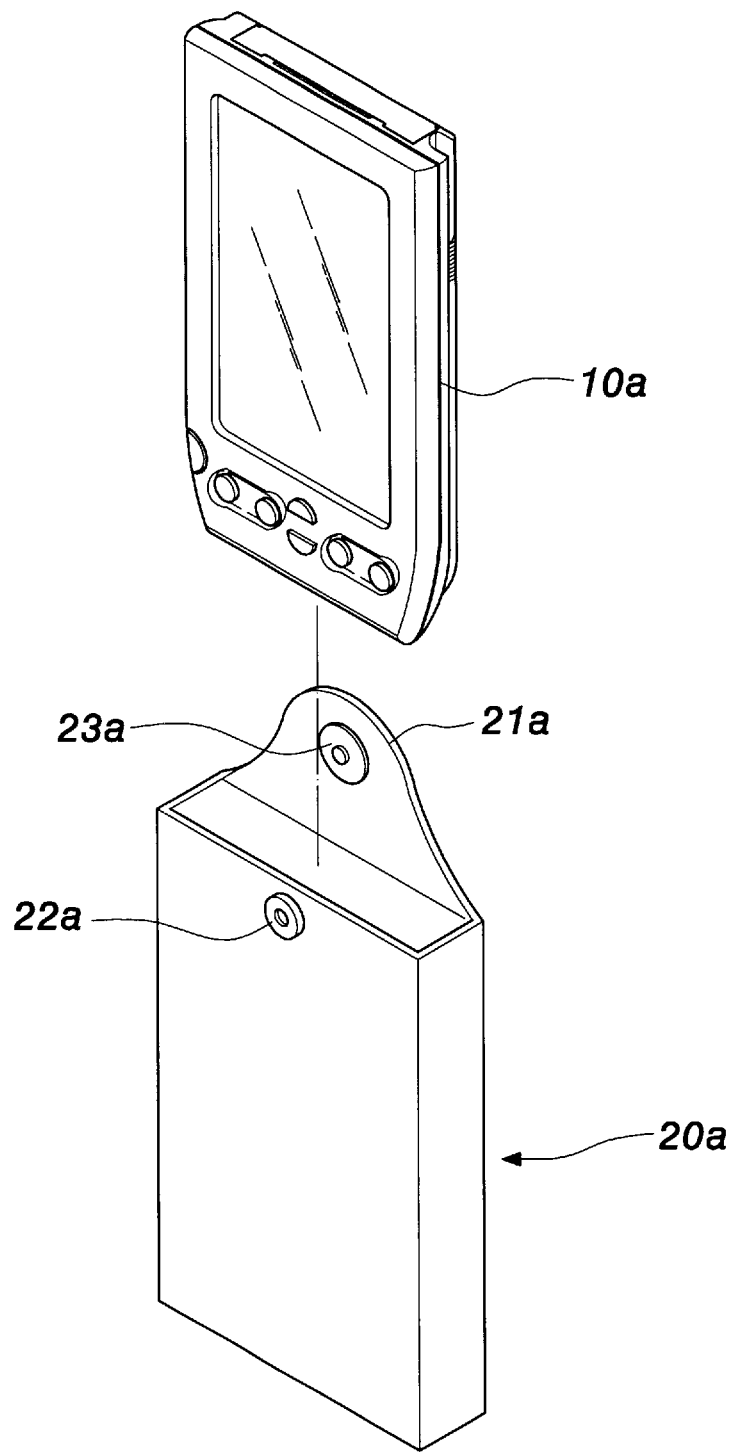
FIG. 1 is a perspective view of a protection sleeve of a PDA in the prior art.
Figure 2:
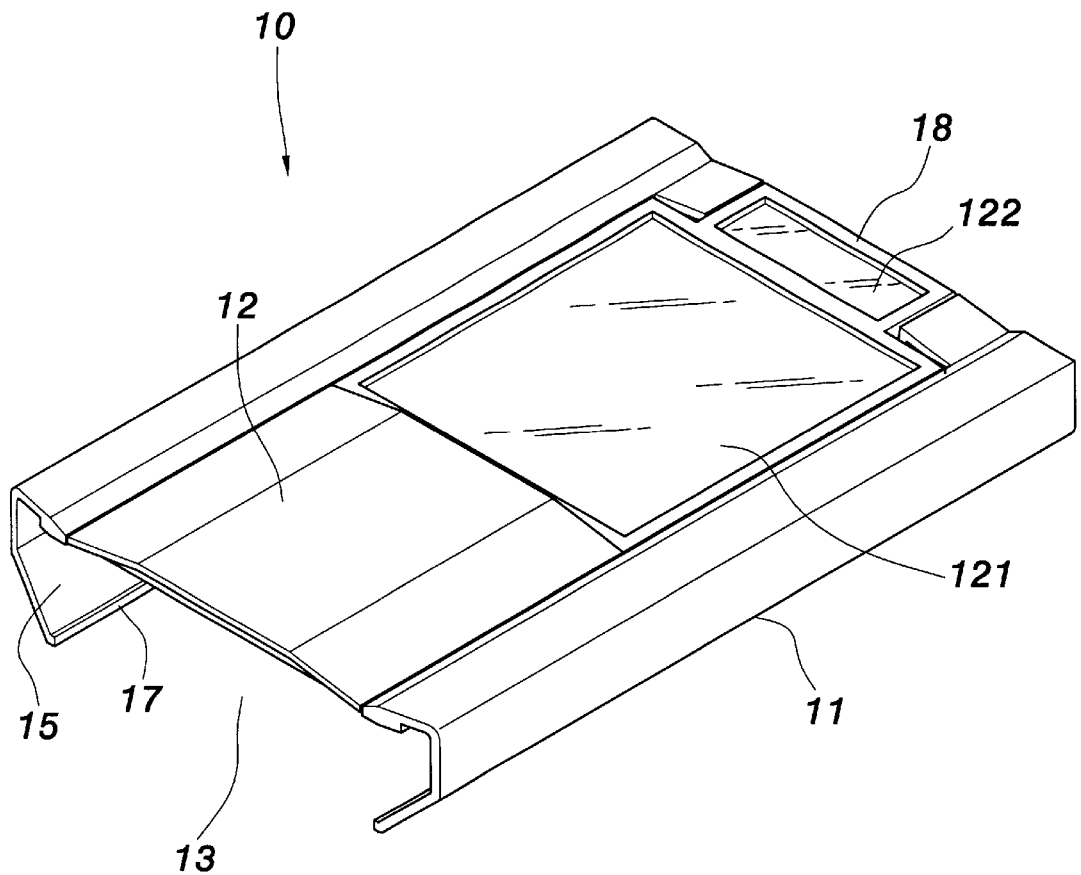
FIG. 2 is a perspective view of the present invention.
Figure 3:
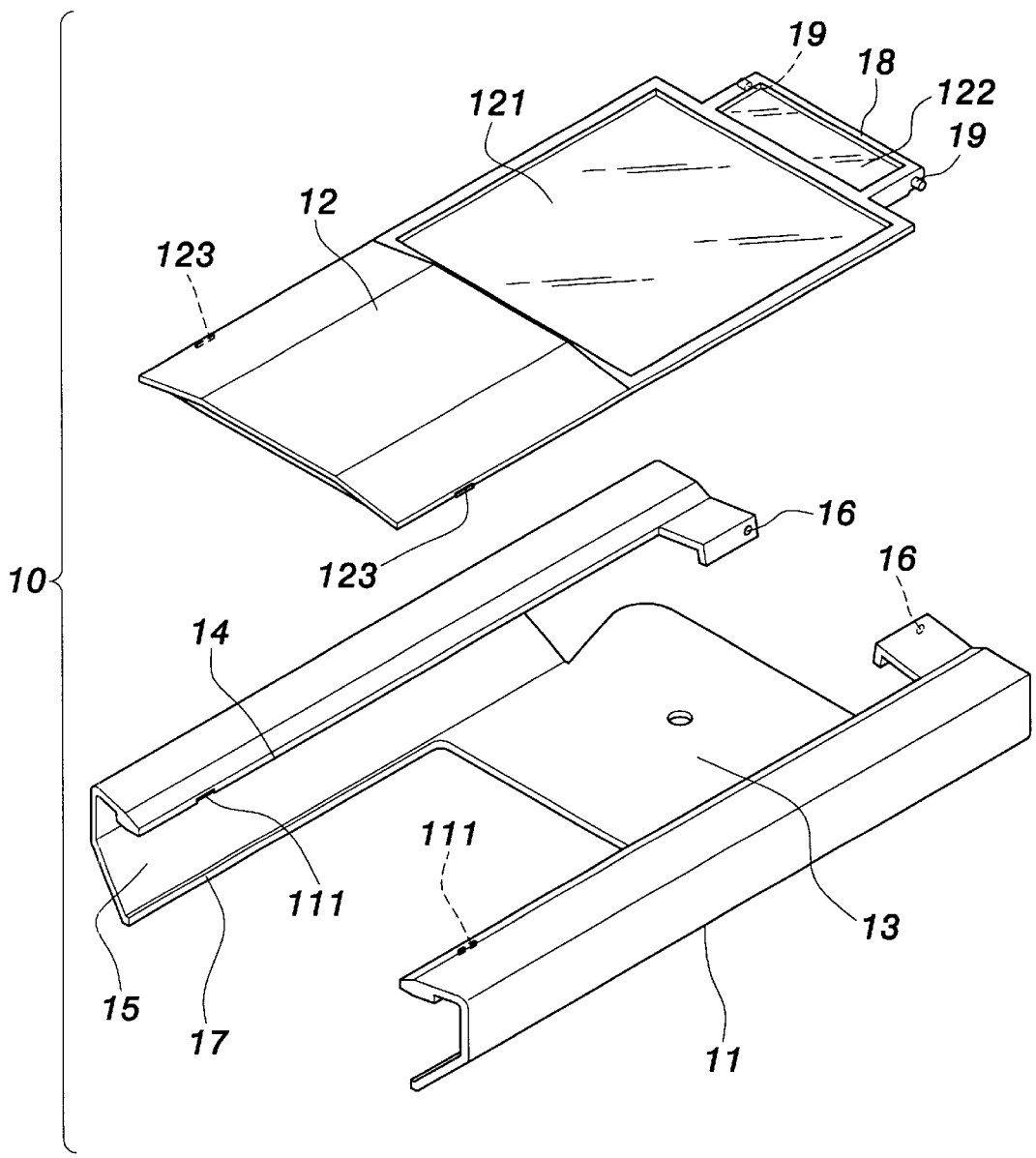
FIG. 3 is an exploded perspective view of the present invention.

As shown in FIGS. 2 and 3, a protection device 10 of the present invention is mainly used to receive a PDA. The protection device 10 comprises a protection shell 11 and a protection cover body 12. The protection shell 11 is a hollow cuboid having a receiving space 13 therein to receive a PDA. The front side of the protection shell 11 is cut out to form a window 14. One end of the protection shell 11 forms an opening 15 so that a PDA can be placed into the receiving space 13 through the opening 15. The other end of the protection shell 11 has two pivotal holes 16. The rear side of the protection shell 11 can also be cut out to form a through hole so that fingers of a user can conveniently stick therein, hence facilitating the access of the PDA.

The protection cover body 12 is a flat panel corresponding to the window 14. One end of the protection cover body 12 has a pivotal seat 18. The pivotal seat 18 has two corresponding pivots 19 thereon. The two pivots 19 can be pivotally matched in the pivotal holes 16 of the protection shell 11 so that the protection shell 11 and the protection cover body 12 can be pivotally joined together. The protection cover body can selectively cover on the window 14 or be unfolded.

Transparent plates 121 and 122 can also be locally disposed on the protection cover body 12, or the whole cover body 12 can be made of transparent material so that information displayed on the electronic panel of the PDA can be clearly seen. Moreover, the protection cover body 12 can have lock bodies 123 thereon, and the protection shell 11 can have corresponding lock grooves 111 so that they can be clamped together through the mutual locking of the lock bodies 123 and the lock grooves 111 when the protection cover body 12 covers on the window 14. A protection cover of a PDA of the present invention is thus formed.

Figure 4:
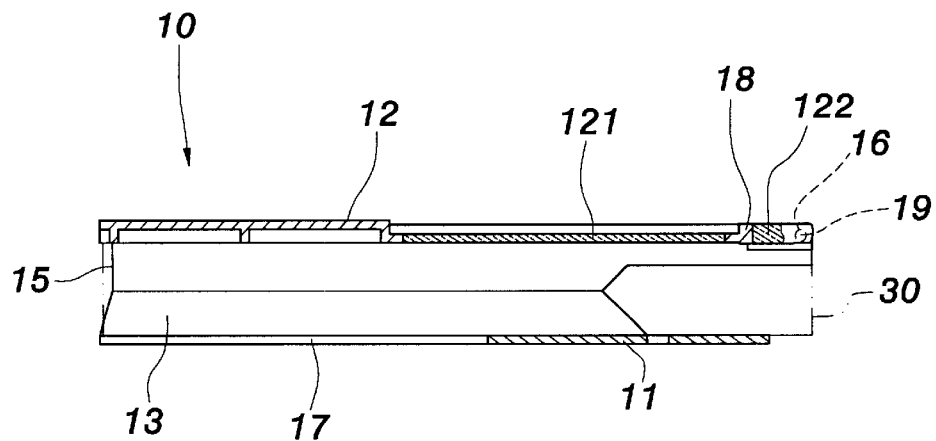
FIG. 4 is a cross-sectional view of the present invention when a PDA is placed therein.
Figure 6:
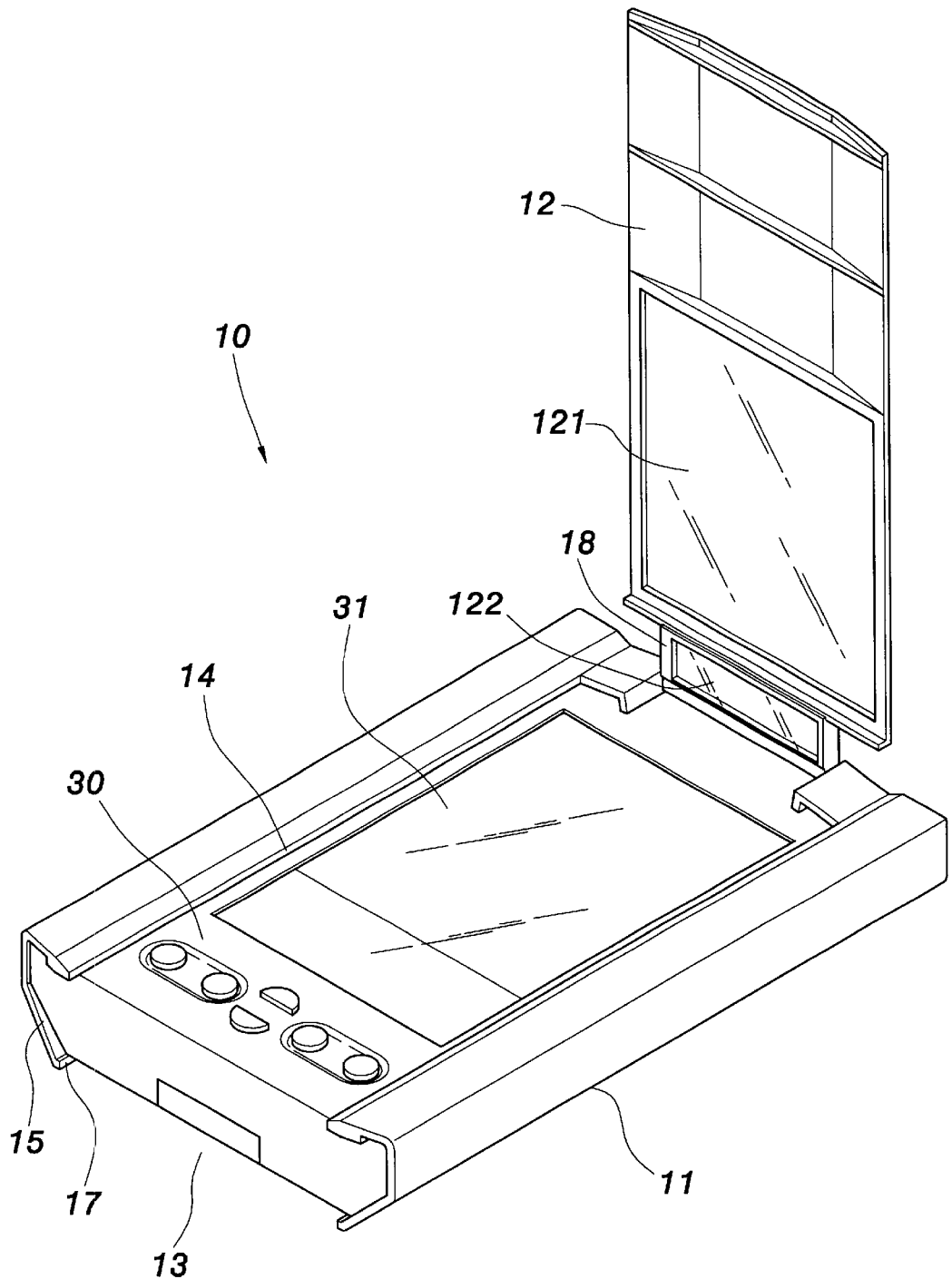
FIG. 6 is a perspective view of the present invention when a PDA is placed therein and a protection cover body thereof is unfolded.

As shown in FIG. 4, a PDA 30 can be inserted into the receiving space 13 of the protection shell 11 through the opening 15. When the PDA 30 is not used, the protection cover body 12 can cover on an electronic panel of the PDA 30 (as shown in FIG. 6) so that the PDA 30 can be exactly kept in the protection device 10. The electronic panel 31 can thus be prevented from abrasion and breakage due to factors such as impact, especially when the PDA is taken along with a user.

Figure 5:
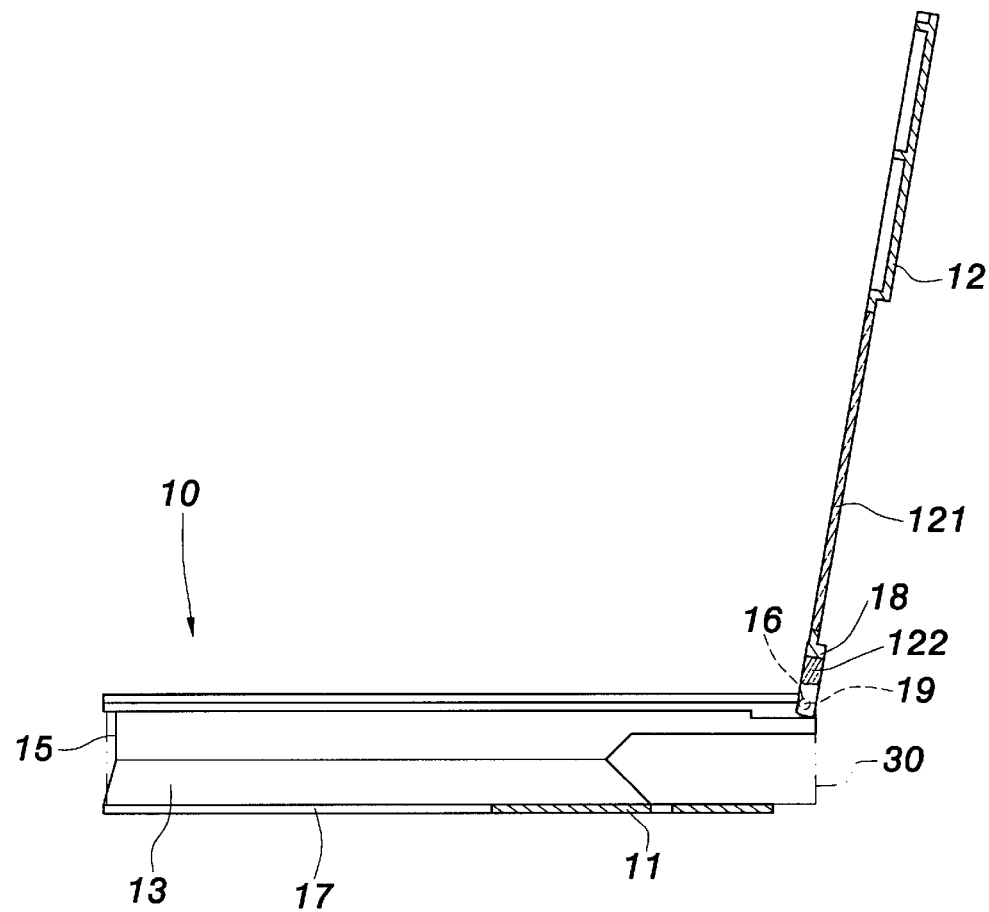
FIG. 5 is a cross-sectional view of the present invention when a PDA is placed therein and a protection cover body thereof is unfolded.

One end of the protection cover body 12 of the present invention is pivotally connected to the protection shell 11 so that the protection shell 12 can be unfolded. As shown in FIGS. 5 and 6, when the PDA 30 is to be used, the protection cover body 12 can be unfolded to expose the electronic panel 31 of the PDA 30 via the window 14 so as to facilitate the operation of the PDA. Normal operations of the PDA 30 will not be affected so that the PDA 30 needs not to be pulled out from the protection device. A user needs not to constantly and repeatedly pull the PDA 30 out from the protection device 10 and then insert the PDA 30 into the protection device 10 after used, hence facilitating the use and keeping of the PDA 30.

Although the present invention has been described with reference to the preferred embodiment thereof, it will be understood that the invention is not limited to the details thereof. Various substitutions and modifications have been suggested in the foregoing description, and other will occur to those of ordinary skill in the art. Therefore, all such substitutions and modifications are intended to be embraced within the scope of the invention as defined in the appended claims.

I claim:

1. A protection device for a personal digital assistant, comprising:

a protection shell having a front end and a rear end; and a protection cover body having a front portion and a rear portion, said rear portion of said protection cover body being pivotally coupled to said rear end of said protection cell, said protection shell including:

a pair of opposite side members extending between said front and rear ends of said proteciton shell, said side memebrs respectively forming therebetween a front opening and a rear opening at said front and rear ends of said protection shell, each said side member having an upper wall and a lower wall connected to said upper wall by a side wall extending along the length of said upper and lower walls, said upper, side and lower walls of each said side member forming a receiving channel extending between said front and rear ends of said protection shell, sides of a personal digital assistant being slidably received in said receiving channels, and the personal digital assistant being accessible at said front and rear openings of said protection shell; and a pair of mounting tabs respectively extending towards each other from said upper wall of said side members of said protection shell at said rear end thereof, each said mounting tab having an edge portion with a pivotal hole formed therein;

said protection cover body including a pivotal seat at said rear portion thereof, said pivotal seat being disposed between said edge portions of said mounting tabs of said protection shell, said pivotal seat having a pair of pivot pins respectively extending from opposing sides thereof in pivotal engagement with said pivotal holes of said mounting tabs.

2. The protection device of a personal digital assistant as claimed in claim 1, wherein said front and rear openings of said protection shell form through holes.

3. The protection device of a personal digital assistant as claimed in claim 1, wherein said protection cover body includes an area made of a transparent material.

4. The protection device of a personal digital assistant as claimed in claim 1, wherein said protection cover has sides thereof and lock bodies located at said sides of said protection cover body, and wherein said protection shell includes lock grooves disposed on said upper walls of said side members in alignment with said lock bodies of said protection cover body for clamping engagement therewith.

* * * * *